(12) United States Patent
Lynch

(10) Patent No.: US 11,825,167 B2
(45) Date of Patent: *Nov. 21, 2023

(54) VIEWER AUTHENTICATION

(71) Applicant: The Nielsen Company (US), LLC, New York, NY (US)

(72) Inventor: Wendell D. Lynch, East Lansing, MI (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/958,993

(22) Filed: Oct. 3, 2022

(65) Prior Publication Data

US 2023/0028470 A1    Jan. 26, 2023

Related U.S. Application Data

(63) Continuation of application No. 17/005,816, filed on Aug. 28, 2020, now Pat. No. 11,463,777, which is a continuation of application No. 16/353,041, filed on Mar. 14, 2019, now Pat. No. 10,779,044.

(51) Int. Cl.
| | |
|---|---|
| *H04N 21/475* | (2011.01) |
| *H04N 21/439* | (2011.01) |
| *H04N 21/442* | (2011.01) |

(52) U.S. Cl.
CPC ..... *H04N 21/4758* (2013.01); *H04N 21/4394* (2013.01); *H04N 21/44204* (2013.01); *H04N 21/44218* (2013.01); *H04N 21/4753* (2013.01)

(58) Field of Classification Search
CPC .......... H04N 21/4758; H04N 21/4394; H04N 21/44204; H04N 21/44218; H04N 21/4753

See application file for complete search history.

(56) References Cited

U.S. PATENT DOCUMENTS

| | | | |
|---|---|---|---|
| 10,779,044 B1* | 9/2020 | Lynch | ............... H04L 63/08 |
| 11,463,777 B2* | 10/2022 | Lynch | .......... H04N 21/44218 |
| 2012/0173701 A1* | 7/2012 | Tenbrock | ........... G06Q 30/0242 |
| | | | 709/224 |
| 2014/0237497 A1* | 8/2014 | Jones | ................ G06F 3/0482 |
| | | | 725/13 |
| 2016/0150274 A1* | 5/2016 | Bilobrov | .............. H04N 21/466 |
| | | | 725/18 |
| 2019/0172080 A1* | 6/2019 | Wirasinghe | ........ G06Q 30/0201 |

* cited by examiner

*Primary Examiner* — Kyu Chae

(57) ABSTRACT

Apparatus, systems, articles of manufacture, and methods for viewer authentication are disclosed. An example system comprises memory, first instructions, and processor circuitry to execute the first instructions to send one or more second instructions to the device, the second instructions to cause the device to trigger collection of audio metering data from a sensed audio signal based on a programming schedule that is to identify when the program is to be broadcast, the program associated with a first time duration, the audio metering data associated with a second time duration, accept voting data from the user for a ballot presented in the program, and transmit the audio metering data and the voting data, determine a level of exposure of the user to the program based on the first time duration and the second time duration, and adjust the voting data based on the level of exposure.

20 Claims, 5 Drawing Sheets

US 11,825,167 B2

VIEWER AUTHENTICATION

RELATED APPLICATION

This patent arises from a continuation of U.S. patent application Ser. No. 17/005,816, which was filed on Aug. 28, 2020, which is a continuation of U.S. patent application Ser. No. 16/353,041, which was filed on Mar. 14, 2019. Priority to U.S. patent application Ser. No. 17/005,816 and U.S. patent application Ser. No. 16/353,041 is claimed. U.S. patent application Ser. No. 17/005,816 and U.S. patent application Ser. No. 16/353,041 are hereby incorporated by reference in their entirety.

FIELD OF THE DISCLOSURE

This disclosure relates generally to audience detection and, more particularly, to viewer authentication.

BACKGROUND

Some broadcasts of competition programs prompt viewers to vote for a contestant. Some programs accept votes from a person who may not have been a viewer.

BRIEF DESCRIPTION OF THE DRAWINGS

The figures are not to scale. Also, in general, the same reference numbers will be used throughout the drawing(s) and accompanying written description to refer to the same or like parts.

Figure 1:
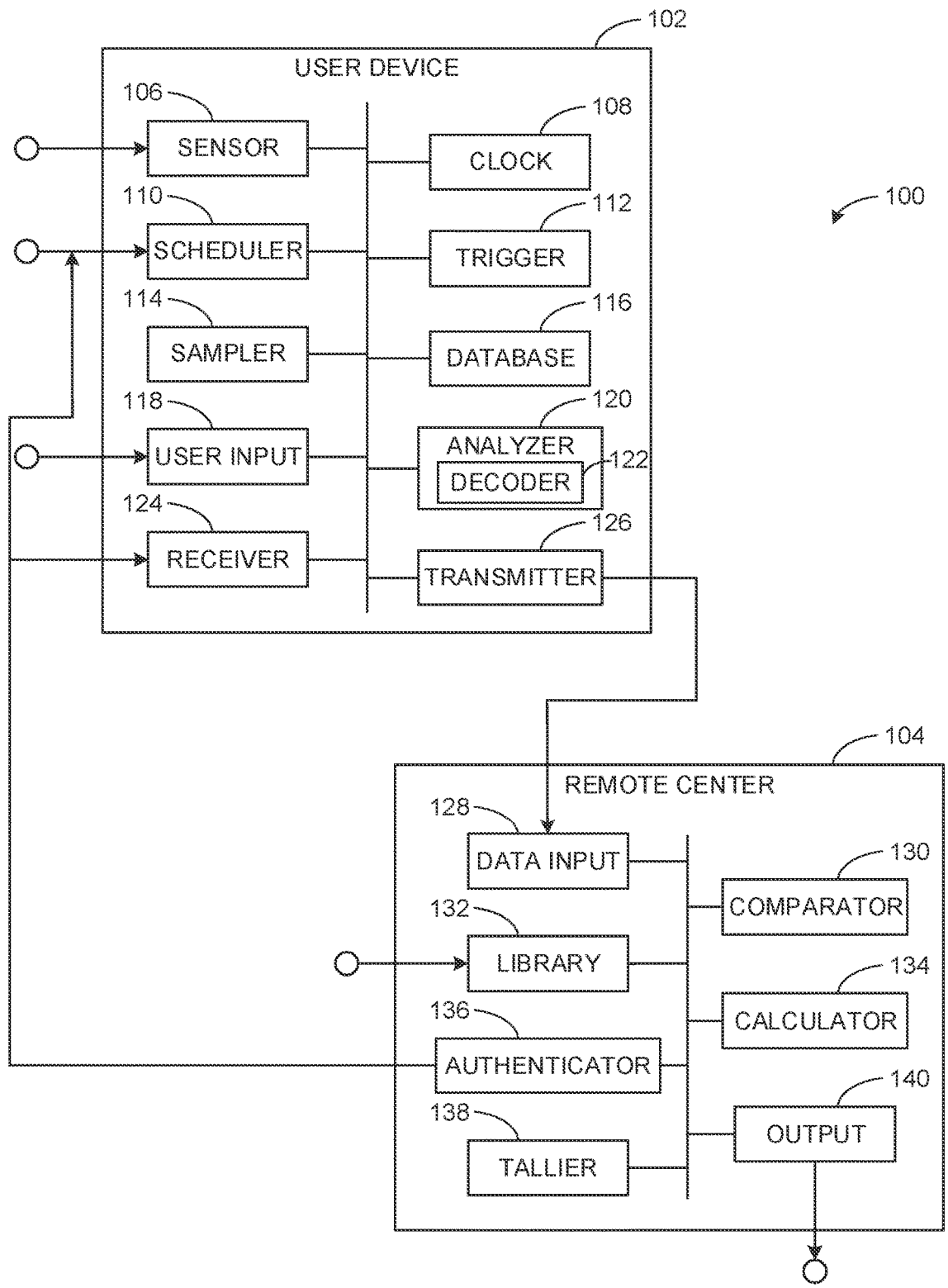
FIG. 1 is a block diagram of an example system for viewer authentication that includes an example user device and example remote center.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Multiple broadcast competition or contest programs include viewer voting results as part of the full scoring criteria for the contest. Broadcasting a program includes transmission of a program via television or radio or streaming a program over the Internet. Social media makes it possible for viewer votes to be cast by people who never actually watch the program, i.e., non-viewers. These non-viewers may be prompted to vote after seeing a post on a social media platform by the contestant, a social media influencer, or other users of the social media platform. Voting by non-viewers can skew the results and lead to a lack of confidence in the scoring system. This disclosure is directed to improving the quality of viewer voting results for broadcast contest programs. Throughout this disclosure, the nouns "broadcast contest program", "contest program," "competition program," "broadcast," "program", "programming," and "show" are used interchangeably.

The techniques disclosed herein confirm that a vote being cast for a contest program corresponds to an actual viewer of the program. In some disclosed examples, a mobile application is executed by a smartphone, tablet, or other mobile device. In other examples, an application or other software program may be run on a desktop computer or other computing device. The term "mobile application" is used herein to refer to any application or software program running on any type of computing device that is programmed and/or structured to operate in accordance with the teachings of this disclosure. Also, throughout this disclosure, "user," "operator", and "voter" may be used interchangeably. "Viewer" and "non-viewer" are used to specify a user, operator, or voter based on exposure to a contest program or other media. In addition, the term "viewer" is meant to encompass listeners of radio programs and/or listeners of television programs and/or internet streaming who are exposed to programs but may not have visually consumed the programs. Similarly, the term "non-viewer" is meant to encompass non-listeners.

The mobile application provides an interface to enable a user to vote for a contestant in a broadcast contest program. In some examples, the mobile application sensed the background audio to gather audio signals broadcast in the contest program. The mobile application samples and analyzes the audio signals to detect watermarks that are broadcast in the audio signals of the contest program and/or to generate signatures from the audio signals of the contest program. In such examples, the confirmation of the voter as a viewer is an authentication using audio watermarking and/or signaturing.

Audio watermarking is a technique used to identify media such as television broadcasts, radio broadcasts, advertisements (television and/or radio), downloaded media, streaming media, prepackaged media, etc. Some audio watermarking techniques identify media by embedding one or more audio codes (e.g., one or more watermarks), such as media identifying information and/or an identifier that may be mapped to media identifying information, into an audio and/or video component. In some examples, the audio or video component is selected to have a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are extracted and used to access a table of reference watermarks that are mapped to media identifying information.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s)(e.g., the audio and/or video signals forming the media presentation being monitored). A signature may be a series of signatures collected in series over a timer interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

In some examples, the mobile application supports live or real time voting in which voting occurs during the broadcast. In some examples, for signature generation, the mobile application can maintain a buffer of a predetermined amount of time of the program such as, for example, X minutes. The mobile application returns the signatures(s) and/or detected watermark(s) with the ballot cast by the voter to a back office or remote, central center where the voters are authenticated and votes are tallied.

In some examples, the mobile application supports delayed voting in which voting occurs after the program is broadcast. In such examples, the mobile application samples the sensed background audio signals to detect watermarks and/or generate signatures during the broadcast time of the program (e.g., based on a program schedule downloaded to the application). The mobile application stores the signatures(s) and/or detected watermark(s), and then reports the stored signatures(s)/watermark(s) with the ballot later cast by the voter.

In either example, the back office analyzes the signature(s)/watermark(s) reported with any user votes to determine whether the signature(s)/watermark(s) correspond to the broadcast contest program and, thus, the voter was actually exposed to the program (e.g., as compared to voting based on social media influencing without actually having viewed the program). If the signature(s)/watermark(s) reported with a viewer's ballot correspond to the broadcast contest program, the vote is given higher weight than another vote that does not have any signature(s)/watermark(s) corresponding to the broadcast contest program. In some examples, votes corresponding to people who are non-viewers may be voided.

Turning to the figures, FIG. 1 is a block diagram of an example system 100 for viewer authentication that includes an example user device 102 and example remote center 104. The example user device 102 is a computing device such as, for example, a computer, a tablet, a mobile phone, a smart watch, etc. The example user device 102 includes an example sensor 106, an example clock 108, an example scheduler 110, an example trigger 112, an example sampler 114, an example database 116, an example user input 118, an example analyzer 120, an example decoder 122, an example receiver 124, and an example transmitter 126. The example remote center 104 may be a computing center such as, for example, a back office processing center at a broadcast studio, an accounting firm, an audience measurement entity, or other entity. The example remote center 104 includes an example data input 128, an example comparator 130, an example library 132, an example calculator 134, an example authenticator 136, an example tallier 138, and an example output 140.

A person or user operating the user device 102 installs the mobile application that provides viewer authentication for voting in broadcast contest programs. The mobile application may be installed to the user device 102 via the receiver 124. In some examples, the mobile application is received from the remote center 104. In other examples, the mobile application is received from another entity such as, for example, an application library including, for example, an app store. In some examples, the mobile application of the user device 102 receives a schedule of broadcast programming via the scheduler 110. The schedule may be saved, for example, in the database 116. The user provides input via the user input 118 including, for example, selection of a programming schedule for broadcast contest programs the user wants to view and/or to submit votes. In other examples, the user is able to participate in a competition voting without preselection of a programming schedule.

The clock 108 maintains timing of the user device 102 in accordance with the time of day. The clock 108 works in concert with the scheduler 110 to develop a schedule for the mobile application. Based on the time of day kept by the clock and the schedule imported into the scheduler 110, the trigger 112 triggers or begins sensing and collection of audio signals. For example, when the clock 108 indicates that the time of day is approaching a broadcast time for a contest program selected by the user based on the broadcast schedule imported by the scheduler 110, the trigger 112 triggers the sensor 106 to sense and collect audio signals.

In some examples, the sensor 106 includes a microphone to sense and collect audio signals from the environment of the user device 102. For example, the sensor 106 collects the background audio from a room in which the user device 102 is located. The sensor 106 gathers audio signals from the contest program if the user device 102 is located near a television, computer, tablet, or other source presenting the contest program. In some examples, the sensor 106 is an array of microphones. In other examples, the sensor 106 can be any device capable of gathering audio signals.

In some examples, the sampler 114 samples the audio signals. Audio signal sampling includes signal processing such as, for example, reducing a continuous time signal to a discrete time signal, analog-to-digital conversion, and/or conversion of the audio signal into frequency components, for example, by Fast Fourier Transform (FFT), wavelet transform, or other time-to-frequency domain transformation.

The analyzer 120 reviews the sampled audio signals. In some examples, the analyzer 120 generates signatures from the audio signals. In other examples, the analyzer 120 includes the decoder 122, which decodes the audio signals to detect watermarks in the audio signals. In these examples, the analyzer 120 extracts audio metering data, which includes the signatures and/or the watermarks, from the audio signal. As detailed above, the audio metering data provides evidence of the programming presented in the environment of the user device 102 and sensed by the sensor 106. In some examples, the audio metering data is stored in a buffer, for example, the database 116.

In some examples, the schedule receiver 110 accepts, receives, or retrieves program schedules for contest programs, reference watermarks, and reference signatures. The program schedules for contest programs, reference watermarks, and reference signatures individually or collectively form broadcast data.

The broadcast data can be used to identify a program. For example, the analyzer 120 can perform a comparison of the audio metering data and the broadcast data. Based on the comparison, the analyzer 120 can determine if the audio metering data matches a program identified by the broadcast data. A match between the audio metering data and the broadcast data is evidence that the user of the user of the user device 102 was exposed to the broadcast program identified by the broadcast data.

During the broadcast of the contest program, the viewer is prompted to vote for a contestant. The viewer can input their vote or ballot into the user input 118. The ballots or multiple ballots are stored in the database 116 as voting data. In some examples, the voting data is stored in the database 116 with corresponding audio metering data. Also, in some examples, the voting data and the audio metering data are timestamped.

The transmitter 126 transmits the audio metering data (the signature(s) and/or watermark(s)) and the voting data to the remote center 104 for analysis and tallying. The transmitter may, in some examples, transmit the sensed audio signal, one or more portions of the sensed audio signal, the sampled signal, and/or one or more portions of the sampled signal instead of the audio metering data. In such examples, the sensed audio signal is processed at the remote center 104.

In some examples, the audio metering data and the voting data are transmitted separately and correlated based on timestamps. In other examples, the audio metering data and the voting data are transmitted together. Also, in some examples, the audio metering data and/or voting data is transmitted during the broadcast of the contest program. In other examples, the audio metering data and/or voting data is transmitted on a delayed schedule including, for example, within a predetermined amount of time after the end of the broadcast. For example, in some contest programs, a voting period is established for a specified period of time after the end of the broadcast. In these examples, the scheduler 110 may receive an indication of the voting period, the clock 108 maintains the timing, and the transmitter 126 may transmit the audio metering data and/or voting data before the expiration of the voting period.

In some examples, the sensor 106 implements sensing means, the scheduler implements scheduling means, the trigger implements triggering means, the sampler implements signal processing means, and the analyzer 120 implements processing means. One or more of the sensing means, the scheduling means, the triggering means, the signal processing means, and/or the processing means may be implemented by a processor such as the processor 412 of FIG. 4 executing instructions such as the instructions of FIG. 2.

The data input 128 of the remote center 104 accepts, receives, or retrieves the audio metering data and voting data from the user device 104. In addition, the data input 128 receives voting data from other sources including, for example, people casting ballots outside of the mobile application. In addition, in some examples, the library 132 accepts, receives, or retrieves the broadcast data including, for example, program schedules for contest programs, reference watermarks, and reference signatures. In other examples, as disclosed above, the broadcast data is alternatively or additionally received and utilized at the user device 102.

As noted above, the broadcast data is useful for identifying a program. In an examples disclosed above, the analyzer 120 of the user device 102 evaluates the audio metering data and the broadcast data to determine exposure by a user casting ballot to a program. In other examples, the evaluation occurs at the remote center 104 where the comparator 130 can access the audio metering data received from the user device 102 and access the broadcast data representative of a program that is received in the library 132. The comparator 130 performs a comparison of the audio metering data and the broadcast data. Based on the comparison, the comparator 130 can determine if the audio metering data provided by the user device matches a program identified by the broadcast data. A match between the audio metering data provided by the user device and the broadcast data is evidence that the user of the user of the user device 102 was exposed to the broadcast program identified by the broadcast data. In some examples, the authenticator 136 authenticates the user of the user device 102 as a viewer based on the match between the audio metering data provided by the user device and the broadcast data.

In some examples, there is no audio metering data corresponding to voting data because, for example, the person casting the ballot did not use the mobile application. In such examples, the comparator 130 cannot determine a match between audio metering data and broadcast data. In this example, the authenticator 136 identifies the user or voter as a non-viewer.

Also, in some examples, the comparator 130 determines a level of exposure of the user of the user device 102 to the program based on the comparison of the audio metering data and the broadcast data. For example, the user may be exposed to the program for a duration, or multiple durations that total to less than the total duration of the program. This indicates that the user was not a viewer of the entire program. In some examples, the comparator 130 determines the amount or level of exposure of the user to the program based on the amount of signatures and/or watermarks in the audio metering data that match corresponding signatures and/or watermarks in the broadcast data. In some examples, the comparator 130 determines the amount or level of exposure of the user to the program based on a time duration of the audio signal sensed at the sensor 106.

In some examples, the voting data is weighted or scaled based on the level of exposure of the viewer to the program. A viewer of an entire program may have the corresponding ballot weighed more heavily than a viewer of less than the entire program. Similarly, a viewer of multiple portions of the program may have the corresponding ballot weighed more heavily than a view who was exposed to only one portion of the program. The calculator 134 can determine a weighting score based on the level of exposure. In examples in which there is no audio metering data corresponding to voting data, the level of exposure may be set to null or zero.

In some examples, the weighting score is binary: the user was exposed to the program or a portion of the program or the user was not exposed to the program. In some examples, the binary level is set more strictly where the user either saw an entire program or did not.

The tallier 138 accesses the voting data received from the user at the data input 128. The tallier 138 modifies and/or scales the voting data according to the weighting score. Thus, a user with a higher weighting score has a more influential vote than a user with a lower weighting score. In the binary weighting score example, the tallier 138 may give zero weight to a user not exposed to the program and full weight to a user exposed to the program. In another example with the binary weighting score, the tallier 138 may give zero weight to a user who has not reached a threshold level of exposure to the program and full weight to a user who has reached the threshold level of exposure to the program. In other words, when the comparator 130 determines that the level of exposure to the program is null, the tallier 138 voids the voting data. In yet other examples, the tallier 138 may give zero weight to a user who has not reached a threshold level of exposure to the program, and the tallier 138 may give scaled weight to a user who has reached the threshold level of exposure to the program. In such examples, the scale of the weight is based on the level of exposure where more weight is given to more exposure.

The authenticator 136 authenticates the user as a viewer based on the scaled voting data. Thus, the authenticator 136 can label a user as a non-viewer based on the user not being exposed to the program or not being exposed to enough of the program (i.e., not being exposed to a threshold level of the program).

The tallier 138 also aggregates scaled voting data from multiple users. In some examples, the tallier 138 aggregates voting data across an audience of the program. Thus, the tallier 138 accesses scaled voting data from voting data received in the data input 128 from multiple user devices 102 and voting data received at the remote center 104, for example also via the data input 128, from people that have not voted through the mobile application on a user device 102. The tallier 138 prepares voting results for the vote presented in the program based on the scaled voting data of the aggregated audience. The voting results can be communicated via the output 140 for presentation to the producers of the program, the broadcasters of the program, the users, the audience, the public, etc.

In some examples, the authenticator 136 determines an external influence or level of external influence based on the scaled voting data. For example, the authenticator 136 analyzes all of the voting data with the scaled voting data to determine a level of voting by users not exposed to the program, not exposed to a threshold level of the program, and/or only exposed to portions of the program. Voting by non-viewers skews the results of the voting by the viewers. In addition, voting by the non-viewers may result for internal influences including, for example, social media influence from posts, trends, or viral activity on social media.

In some examples, the authenticator 136 determines the external influence based on trends in the weighting scores. For example, a large number of low weighting scores or negative weighting scores could correlate to a higher level of external influence. Likewise, fewer low weighting scores than high weighting scores could correlate to a lower level of external influence. Also, in some examples, the external influence may be determined based on an average or mean of the weighting scores.

Also, in some examples, the authenticator 136 send instructions to the user device 102 to perform the aforementioned activity including data collection by instructing the user device 102 to at least trigger the sensing or collection of an audio signal based on a programming schedule that is to identify when the program is to be broadcast; sample the sensed audio signal; decode the audio metering data from the audio signal; accept the voting data from the user; transmit the audio metering data for access by the comparator; and transmit the voting data for access by the tallier. Such instructions may be received by the receiver 124 of the user device. In some examples, the instructions are sent to multiple user devices simultaneously or in succession. In some examples, the instructions are broadcast at the beginning or prior to the beginning of the broadcast of the program. In some examples, the instructions are included with the installation of the mobile application.

Viewers may be induced to install the mobile application on their respective user devices 102 in order to have their ballot count (in example in which non-viewer votes are voided) or to have their ballots weighted more heavily (in examples in which longer exposure to a program results in greater weight attached to a corresponding ballot and shorter exposure to a program results in a reduced weight attached to a corresponding ballot).

In some examples, the comparator 130 implements determining means including means for determining the level of exposure of the user of the user device 102 to the program. In some examples, the calculator 134 implements calculating means including means for calculating the weighting score. In some examples, the tallier 138 implements tallying means including means for scaling votes and tallying votes. In some examples, the authenticator 136 implements authenticating means including means for authenticating the user as a viewer of the program. One or more of the determining means, the calculating means, the tallying means, and/or the authenticating means may be implemented by a processor such as the processor 512 of FIG. 5 executing instructions such as the instructions of FIG. 4.

While an example manner of implementing the user device 102 and the remote center 104 are illustrated in FIG. 1, one or more of the elements, processes, and/or devices illustrated in FIG. 1 may be combined, divided, re-arranged, omitted, eliminated, and/or implemented in any other way. Further, the example sensor 106, the example clock 108, the example scheduler 110, the example trigger 112, the example sampler 114, the example user input 118, the example analyzer 120, the example decoder 122, the example receiver 124, the example transmitter, the example data input 128, the example comparator 130, the example calculator 134, the example authenticator 136, the example tallier 138, the example output 140, and/or, more generally, the example user device 102 and/or remote center 104 of FIG. 1 may be implemented by hardware, software, firmware, and/or any combination of hardware, software, and/or firmware. Thus, for example, any of the example sensor 106, the example clock 108, the example scheduler 110, the example trigger 112, the example sampler 114, the example user input 118, the example analyzer 120, the example decoder 122, the example receiver 124, the example transmitter, the example data input 128, the example comparator 130, the example calculator 134, the example authenticator 136, the example tallier 138, the example output 140, the example user device 102, and/or remote center 104 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example sensor 106, the example clock 108, the example scheduler 110, the example trigger 112, the example sampler 114, the example user input 118, the example analyzer 120, the example decoder 122, the example receiver 124, the example transmitter, the example data input 128, the example comparator 130, the example calculator 134, the example authenticator 136, the example tallier 138, the example output 140, the example user device 102, and/or remote center 104 is/are hereby expressly defined to include a non-transitory computer readable storage device or storage disk such as a memory, a digital versatile disk (DVD), a compact disk (CD), a Blu-ray disk, etc. including the software and/or firmware. Further still, the example user device 102 and/or remote center 104 of FIG. 1 may include one or more elements, processes. and/or devices in addition to, or instead of, those illustrated in FIG. 1, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 2:
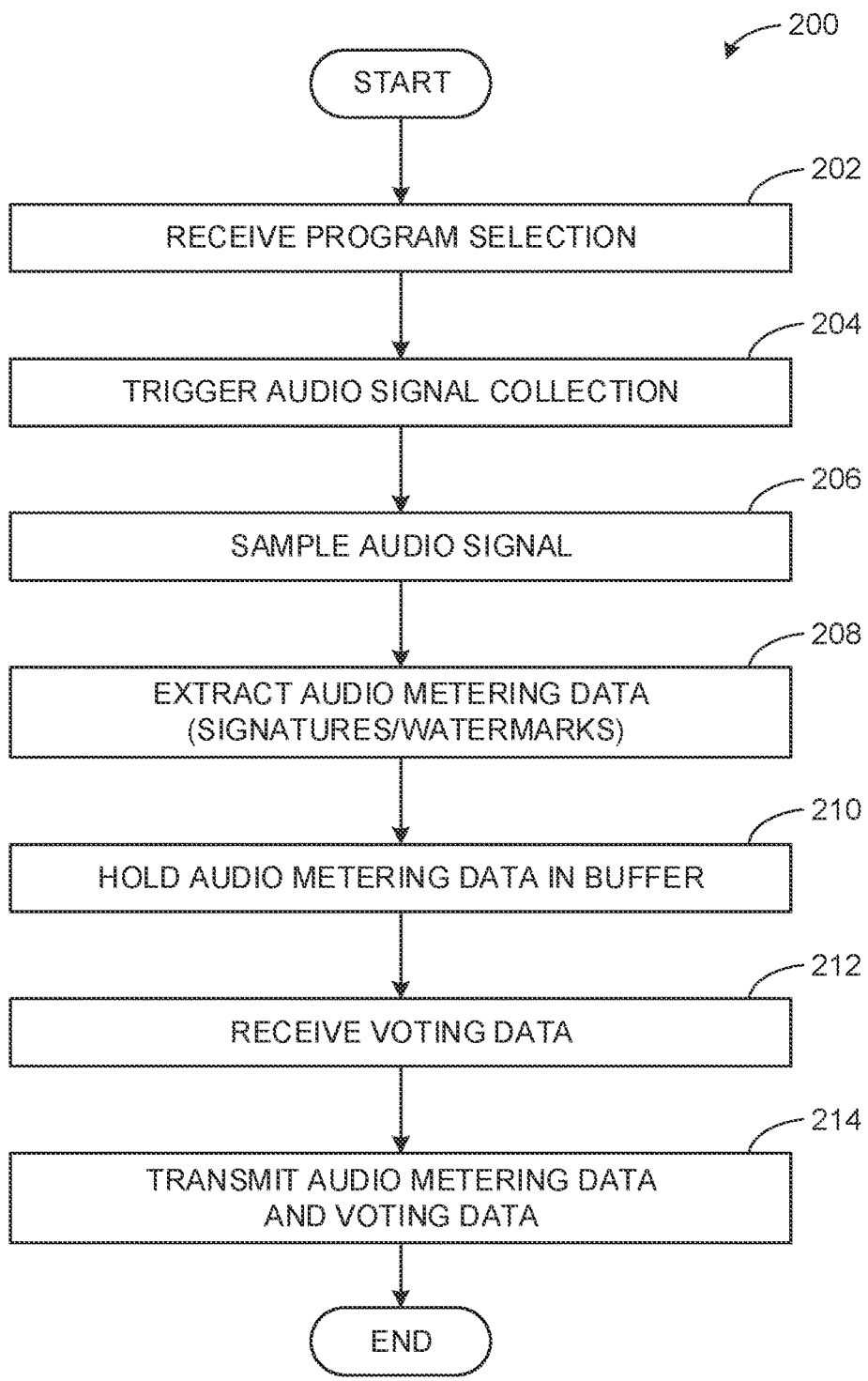
FIG. 2 is a flowchart representative of machine readable instructions which may be executed to implement the example user device of FIG. 1.

A flowchart representative of example hardware logic, machine readable instructions, hardware implemented state machines, and/or any combination thereof for implementing the user device 102 of FIG. 1 is shown in FIG. 2. The machine readable instructions may be one or more executable programs or portion(s) of an executable program for execution by a computer processor such as the processor 412 shown in the example processor platform 400 discussed below in connection with FIG. 4. The program may be embodied in software stored on a non-transitory computer readable storage medium such as a CD-ROM, a floppy disk, a hard drive, a DVD, a Blu-ray disk, or a memory associated with the processor 412, but the entire program and/or parts thereof could alternatively be executed by a device other than the processor 412 and/or embodied in firmware or dedicated hardware. Further, although the example program is described with reference to the flowchart illustrated in FIG. 2, many other methods of implementing the example user device 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

Figure 3:
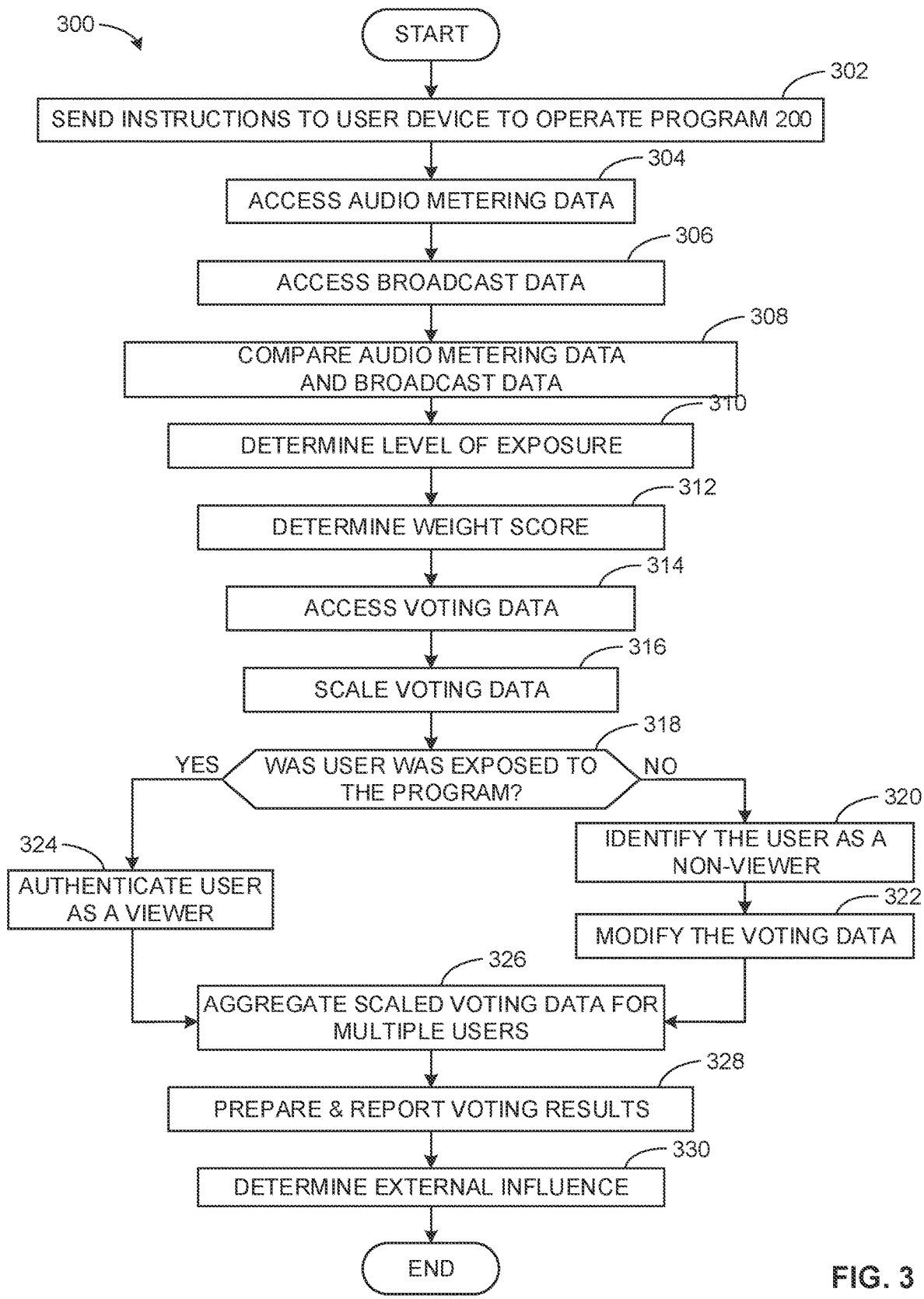
FIG. 3 is a flowchart representative of machine readable instructions which may be executed to implement the example remote center of FIG. 1.

A flowchart representative of example hardware logic, machine readable instructions, hardware implemented state machines, and/or any combination thereof for implementing the remote center 104 of FIG. 1 is shown in FIG. 3. The machine readable instructions may be one or more executable programs or portion(s) of an executable program for execution by a computer processor such as the processor 512 shown in the example processor platform 500 discussed below in connection with FIG. 5. The program may be embodied in software stored on a non-transitory computer readable storage medium such as a CD-ROM, a floppy disk, a hard drive, a DVD, a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowchart illustrated in FIG. 3, many other methods of implementing the example remote center 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an op-amp, a logic circuit, etc.) structured to perform the corresponding operation without executing software or firmware.

In some examples one or more elements of the instructions of FIG. 2 and the instructions of FIG. 3 may be combined or rearranged. For example, the user device 102 may perform one or more of the instructions of FIG. 3. In addition, the remote center 104 may perform one or more of the instructions of FIG. 2.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIGS. 2 and 3 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

The program 200 of FIG. 2 may operate via the user device 102 that has the mobile application for viewer authentication installed as described above. The mobile application includes a schedule of broadcast programming, for example received by or gathered by the scheduler 110 prior to the user operating the program 200 of FIG. 2. The user input 118 of the user device 102 receives a program selection from a user indicating what contest programs the user intends to view, intends to cast ballots for, or otherwise has interest (block 202).

Based on a schedule for the mobile application developed by the clock 108 and the scheduler 110 in accordance with the contest programs selected by the user, the trigger 112 triggers or begins the collection of sensed audio signals by the sensor 106 (block 204). For example, the sensor 106 collects audio signals sensed from the environment of the user device 102. The sensor 106 gathers audio signals from the contest program when the user device 102 is located near a television, computer, tablet, or other source presenting the contest program.

The sampler 114 samples the audio signal (block 206) to transform the sensed audio signal into a digital signal and/or frequency components for further processing. The analyzer 120 analyzes the sampled audio signals to extract audio metering data including signature(s) and/or watermark(s) (block 208). In some examples, the analyzer 120 generates signatures from the sensed audio signals, and in other examples, the analyzer 120 decodes the sensed audio signals to detect watermarks in the sensed audio signals. The audio metering data provides evidence of the programming presented in the environment of the user device 102. The database 116 stores or holds the audio metering data in a buffer in some examples (block 210).

When or after a user is prompted to vote during the broadcast of the contest program, the user input 118 receives the vote or multiple votes, which are stored in the database 116 as voting data (block 212).

The transmitter 126 transmits the audio metering data (the signature(s) and/or watermark(s)) and the voting data to the remote center 104 for analysis and tallying (block 214). The program 200 implemented by the user device 102 then ends. In some examples, the program 200 is implemented multiple times where the user input 118 receives another selection of programming from the user (block 202) and/or where the user has already selected multiple programs, and the trigger 112 triggers collection of audio signals based on one of the other selected programs (block 204).

The program 300 of FIG. 3 may operate via the remote center 104. In some examples, the program 300 of FIG. 3 includes the authenticator 136 sending instructions to the user device 102 (or multiple user devices 102) to perform the program 200 of FIG. 2 (block 302). The instructions to the user device 102 prompt the collection of audio metering data and voting data.

The comparator 130 accesses audio metering data received by the data input 128 of the remote center 104 from the user device 104 (block 304). The comparator also accesses broadcast data representative of a program that is received in the library 132 (block 306). The broadcast data includes, for examples, schedules for contest programs, reference watermarks, and/or reference signatures. The comparator 130 performs a comparison of the audio metering data and the broadcast data (block 308).

The comparator 130 determines a level of exposure of the user of the user device 102 to the program based on the comparison of the audio metering data and the broadcast data (block 310). In some examples, the comparator 130 determines the amount or level of exposure of the user to the program based on the amount of signatures and/or watermarks in the audio metering data that match corresponding signatures and/or watermarks in the broadcast data and/or based on a time duration of the audio signal sensed at the sensor 106. In other examples, as disclosed above, the analyzer 120 of the user device 102 performs a comparison of the audio metering data and the broadcast data and determines a level of exposure of the user of the user device 102 to the program based on the comparison of the audio metering data and the broadcast data.

The calculator 134 determines a weighting score based on the level of exposure (block 312). The weighting score is used to scale the voting data based on the level of exposure of the viewer to the program. Viewers of a program or viewers of a relatively higher portions of a program may have the corresponding ballot or vote weighed more heavily than a non-viewer or a viewer of a relatively lower portion of the program.

The tallier 138 accesses the voting data received from the user at the data input 128 (block 314). The tallier 138 scales the voting data according to the weighting score (block 316).

Based on the comparison of the audio metering data and the broadcast data, the comparator 130 determines if the user device 102 was exposed to the broadcast program identified by the broadcast data (block 318). In other examples, the analyzer 120 of the user device 102 determines if the user device 102 was exposed to the broadcast program identified by the broadcast data.

In some examples, the comparator 130 determines that the user was not exposed to the broadcast program if the audio metering data provided by the user device does not match a program identified by the broadcast data. In other examples, the comparator 130 determines that the user was not exposed to the broadcast program if there is no audio metering data corresponding to voting data. When the comparator 130 determines that the user was not exposed to the broadcast program, the authenticator 136 identifies the user or voter as a non-viewer (block 320). Also, as disclosed above, in some examples, the comparator 130 determines a level of exposure, and the authenticator 136 identifies the user or voter as a non-viewer if the level of exposure does not meet a threshold level of exposure. The threshold level may be set based on time and also may be set in term of a particular number of minutes of exposure to the program or in terms of a particular percentage of exposure of the program relative to the overall length of the program. If the user has been identified as a non-viewer, the tallier 138 modifies the voting data for that user (block 322). In some examples, the modification includes voiding the voting data for that user. In other examples, the non-viewer voting data is not voided but, rather, the modification includes reducing the voting data to a diminished clout or impact based on a lower weight assigned to the voting data due to a lack of matching between the audio metering data and broadcast data and/or a low level of exposure that fails to meet the threshold.

Returning to block 318, in some examples, the comparator 130 determines that the user was exposed to the broadcast program if the audio metering data provided by the user device matches a program identified by the broadcast data. When the comparator 130 determines that the user was exposed to the broadcast program, the authenticator 136 identifies or authenticates the user or voter as a viewer (block 324). Also, as disclosed above, in some examples, the comparator 130 determines a level of exposure, and the authenticator 136 authenticates the user or voter as a viewer if the level of exposure meets a threshold level such, as for example, the threshold levels disclosed above. In some examples, the authenticator 136 authenticates the user of the user device 102 as a viewer based on the scaled voting data.

The tallier 138 aggregates or tallies scaled voting data from multiple users (block 326). In some examples, the tallied voting data includes voting data for viewers. In some examples, the tallied voting data is scaled based on user exposure to the program. Also, in some examples, the non-viewer voting data is excluded, while in other examples the non-viewer voting data is included with decreased weight. The tallier 138 prepares and reports voting results for the vote presented in the program based on the scaled voting data of the aggregated or tallied voting data (block 328).

In some examples, the authenticator 136 determines an external influence or level of external influence based on the scaled voting data (block 330). The external influence may be the result of social media activity that prompts people to enter votes without viewing the program. The authenticator 136 can analyze the raw voting data, the scaled voting data, and any identifications of non-viewers to determine a level of voting by non-viewers and/or underexposed viewers, which are users not exposed to a threshold level of the program and/or only exposed to portions of the program.

Figure 4:
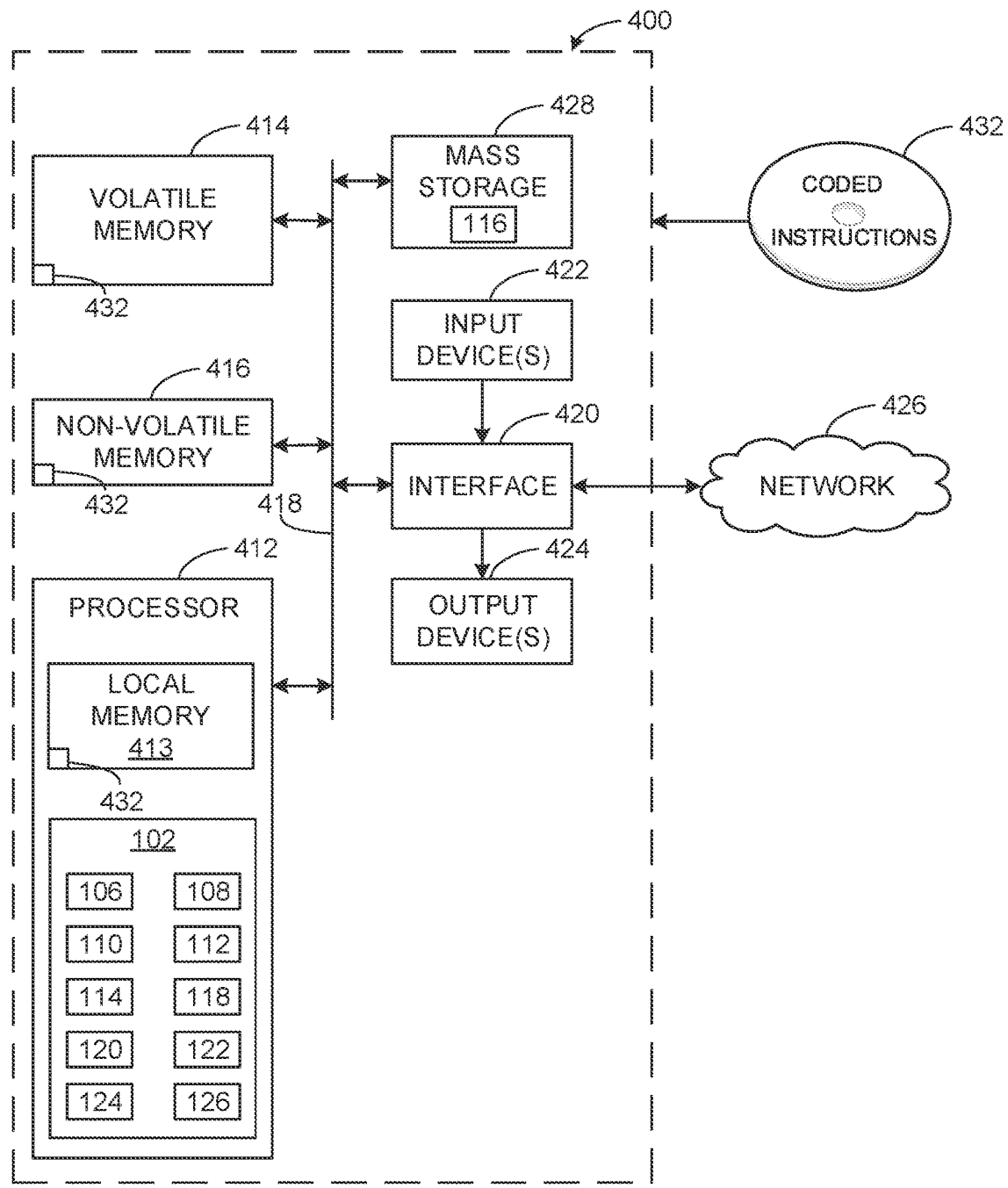
FIG. 4 is a block diagram of an example processing platform structured to execute the instructions of FIG. 2 to implement the example user device of FIG. 1.

FIG. 4 is a block diagram of an example processor platform 400 structured to execute the instructions of FIG. 2 to implement the user device 102 of FIG. 1. The processor platform 400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset, or other wearable device, or any other type of computing device.

The processor platform 400 of the illustrated example includes a processor 412. The processor 412 of the illustrated example is hardware. For example, the processor 412 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 412 implements the sensor 106, the clock 108, the scheduler 110, the trigger 112, the sampler 114, the user input, the analyzer 120, the decoder 122, the receiver 124, and the transmitter 126.

The processor 412 of the illustrated example includes a local memory 413 (e.g., a cache). The processor 412 of the illustrated example is in communication with a main memory including a volatile memory 414 and a non-volatile memory 416 via a bus 418. The volatile memory 414 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 416 may be implemented by flash memory and/or any other desired type of memory device. Access to the main memory 414, 416 is controlled by a memory controller.

The processor platform 400 of the illustrated example also includes an interface circuit 420. The interface circuit 420 may be implemented by any type of interface standard, such as an Ethernet interface, a universal serial bus (USB), a Bluetooth® interface, a near field communication (NFC) interface, and/or a PCI express interface.

In the illustrated example, one or more input devices 422 are connected to the interface circuit 420. The input device(s) 422 permit(s) a user to enter data and/or commands into the processor 412. The input device(s) can be implemented by, for example, an audio sensor, a microphone, a camera (still or video), a keyboard, a button, a mouse, a touchscreen, a track-pad, a trackball, isopoint, and/or a voice recognition system.

One or more output devices 424 are also connected to the interface circuit 420 of the illustrated example. The output devices 424 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 420 of the illustrated example, thus, typically includes a graphics driver card, a graphics driver chip, and/or a graphics driver processor.

The interface circuit 420 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 426. The communication can be via, for example, an Ethernet connection, a digital subscriber line (DSL) connection, a telephone line connection, a coaxial cable system, a satellite system, a line-of-site wireless system, a cellular telephone system, etc.

The processor platform 400 of the illustrated example also includes one or more mass storage devices 428 for storing software and/or data. Examples of such mass storage devices 428 include floppy disk drives, hard drive disks, compact disk drives, Blu-ray disk drives, redundant array of independent disks (RAID) systems, and digital versatile disk (DVD) drives.

The machine executable instructions 432 of FIG. 2 may be stored in the mass storage device 428, in the volatile memory 414, in the non-volatile memory 416, and/or on a removable non-transitory computer readable storage medium such as a CD or DVD.

FIG. 4 is a block diagram of an example processor platform 500 structured to execute the instructions of FIG. 3 to implement the remote center 104 of FIG. 1. The processor platform 500 can be, for example, a server, a personal computer, a workstation, a self-learning machine (e.g., a neural network), a mobile device (e.g., a cell phone, a smart phone, a tablet such as an iPad™), a PDA, an Internet appliance, or any other type of computing device.

The processor platform 50 of the illustrated example includes a processor 512. The processor 512 of the illustrated example is hardware. For example, the processor 512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 512 implements the data input 128, the comparator 130, the calculator 134, the authenticator 138, the tallier 138, and the output 140.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by SDRAM, DRAM, RDRAM®, and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a USB, a Bluetooth® interface, an NFC interface, and/or a PCI express interface.

In the illustrated example, one or more input devices 522 are connected to the interface circuit 520. The input device(s) 522 permit(s) a user to enter data and/or commands into the processor 512. The input device(s) can be implemented by, for example, an audio sensor, a microphone, a camera (still or video), a keyboard, a button, a mouse, a touchscreen, a track-pad, a trackball, isopoint, and/or a voice recognition system.

One or more output devices 524 are also connected to the interface circuit 520 of the illustrated example. The output devices 424 can be implemented, for example, by display devices (e.g., LED(s), OLED(s), LCD(s), a CRT display, an IPS, a touchscreen, etc.), a tactile output device, a printer, and/or speaker. The interface circuit 520 of the illustrated example, thus, typically includes a graphics driver card, a graphics driver chip, and/or a graphics driver processor.

The interface circuit 520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 526. The communication can be via, for example, an Ethernet connection, a DSL connection, a telephone line connection, a coaxial cable system, a satellite system, a line-of-site wireless system, a cellular telephone system, etc.

The processor platform 500 of the illustrated example also includes one or more mass storage devices 528 for storing software and/or data. Examples of such mass storage devices 528 include floppy disk drives, hard drive disks, compact disk drives, Blu-ray disk drives, RAID systems, and DVD drives.

The machine executable instructions 532 of FIG. 3 may be stored in the mass storage device 528, in the volatile memory 514, in the non-volatile memory 516, and/or on a removable non-transitory computer readable storage medium such as a CD or DVD.

Figure 5:
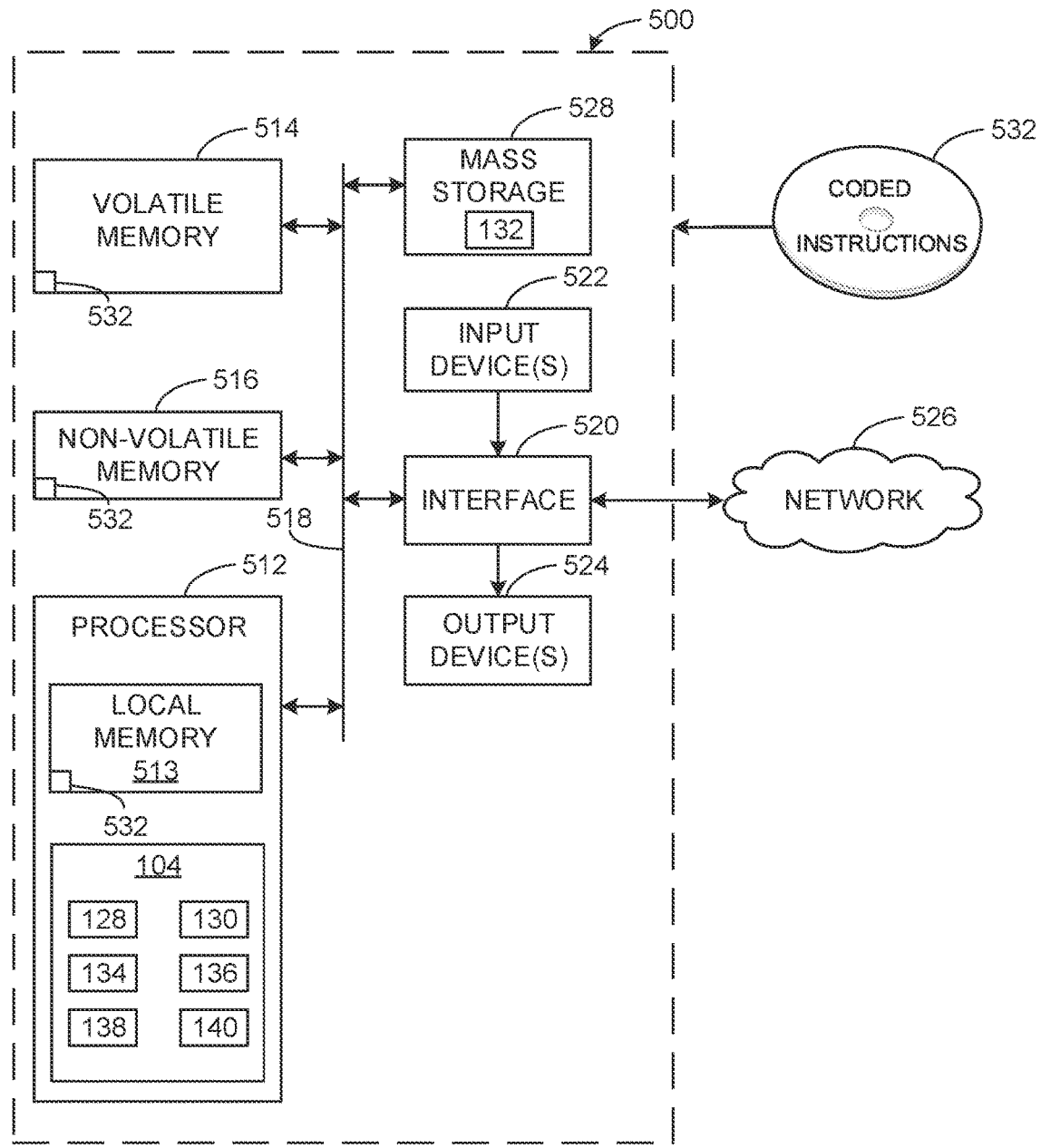
FIG. 5 is a block diagram of an example processing platform structured to execute the instructions of FIG. 3 to implement the example remote center of FIG. 1.

In some examples, one or more elements of the processor platform 400 of FIG. 4 may appear alternatively or additionally in the processor platform 500 of FIG. 5. Likewise, in some examples, one or more elements of the processor platform 500 of FIG. 5 may appear alternatively or additionally in the processor platform 400 of FIG. 4. In other words, some elements of the user device 102 may also be included or may alternatively be included in the remote center 104 and vice versa.

From the foregoing, it will be appreciated that example systems, methods, apparatus, and articles of manufacture have been disclosed that authenticate viewers of broadcast contest programs. These techniques can be used to confirm that voting in a competition presented in a broadcast contest program originates from voters who actually viewed the program or, in some examples, that viewers of the program have votes that are more heavily weighted than non-viewers or underexposed viewers. In addition, the techniques disclosed herein can be used to determine the level of external influence such as the influence produced by social media activity. In addition the techniques disclosed herein are beneficial to broadcasters because the viewer authentication disclosed herein can be used to give more confidence in the voting results and reduce accusations of rigged or unfair competition.

Disclosed herein are apparatus, systems, articles of manufacture, and methods for viewer authentication. An example system to authenticate a viewer includes a comparator to access audio metering data received from a user device and determine a level of exposure of a user of the user device to a program based on the audio metering data. The example system also includes a calculator to determine a weighting score based on the level of exposure. In addition, the example system includes a tallier to access voting data received from the user device for a ballot presented in the program and scale the voting data based on the weighting score.

In some examples, the system further includes an authenticator to authenticate the user as a viewer of the program based on the scaled voting data.

In some examples, the weighting score is binary.

In some examples, when the comparator determines that the level of exposure is null, the tallier is to void the voting data, and the authenticator is to identify the user as a non-viewer.

In some examples, the tallier is to aggregate scaled voting data for multiple users and prepare voting results for the ballot presented in the program based on the scaled voting data. In such examples, the authenticator is to determine an external influence based on the scaled voting data.

In some examples, the external influence includes social media influence.

In some examples, the level of exposure is based on a duration of the audio metering data.

In some examples, the audio metering data includes audio signatures.

In some examples, the audio metering data includes audio watermarks.

In some examples, wherein the authenticator is to send instructions to the user device to: trigger collection of the audio metering data based on a programming schedule that is to identify when the program is to be broadcast; sample a sensed audio signal when the collection of the audio metering data is triggered; determine the audio metering data from the sensed audio signal; accept the voting data from the user; transmit the audio metering data for access by the comparator; and transmit the voting data for access by the tallier.

Also disclosed herein is an example non-transitory computer readable storage medium comprising computer readable instructions that, when executed, cause one or more processors to, at least: determine a level of exposure of a user of a user device to a program based on audio metering data received from the user device; determine a weighting score based on the level of exposure; and access voting data received from the user device for a ballot presented in the program; and scale the voting data based on the weighting score.

In some examples, the instructions further cause the one or more processors to authenticate the user as a viewer of the program based on the scaled voting data.

In some examples, when the level of exposure is null, the instructions further cause the one or more processors to: void the voting data; and identify the user as a non-viewer.

In some examples, the instructions further cause the one or more processors to: aggregate scaled voting data for multiple users; prepare voting results for the ballot presented in the program based on the scaled voting data; and determine an external influence based on the scaled voting data.

In some examples, the instructions further cause the one or more processors to send instructions to the user device to: trigger collection of the audio metering data based on a programming schedule that is to identify when the program is to be broadcast; sample a sensed audio signal when the collection of the audio metering data is triggered; determine the audio metering data from the sensed audio signal; accept the voting data from the user; transmit the audio metering data for access by the one or more processors; and transmit the voting data for access by the one or more processors.

An example system to authenticate a viewer is disclosed. The example system includes means for determining a level of exposure of a user of a user device to a program based on audio metering data received from the user device and means for calculating a weighting score based on the level of exposure. The example system also includes means for tallying votes. In this example, the means for tallying votes is to: access voting data received from the user device for a ballot presented in the program; and scale the voting data based on the weighting score.

In some examples, the system further includes means for authenticating the user as a viewer of the program based on the scaled voting data.

In some examples, when the means for determining determines that the level of exposure is null, the means for tallying is to void the voting data, and the means for authenticating is to identify the user as a non-viewer.

In some examples, the means for tallying is to: aggregate scaled voting data for multiple users; and prepare voting results for the ballot presented in the program based on the scaled voting data. In such examples, the means for authenticating is to determine an external influence based on the scaled voting data.

In some examples, the means for authenticating is to send instructions to the user device to: trigger collection of the audio metering data based on a programming schedule that is to identify when the program is to be broadcast; sample a sensed audio signal when the collection of the audio metering data is triggered; determine the audio metering data from the sensed audio signal; accept the voting data from the user; transmit the audio metering data for access by the comparator; and transmit the voting data for access by the tallier.

An example method to authenticate a viewer is disclosed. The example method includes accessing, by executing instructions with a processor, audio metering data received from a user device; determining, by executing instructions with the processor, a level of exposure of a user of the user device to a program based on the audio metering data; determining, by executing instructions with the processor, a weighting score based on the level of exposure; accessing, by executing instructions with the processor, voting data received from the user device for a ballot presented in the program; and scaling, by executing instructions with the processor, the voting data based on the weighting score.

In some examples, the method includes authenticating, by executing instructions with the processor, the user as a viewer of the program based on the scaled voting data.

In some examples, the when the level of exposure is null, the method further includes: voiding, by executing instructions with the processor, the voting data; and identifying, by executing instructions with the processor, the user as a non-viewer.

In some examples, the method includes aggregating, by executing instructions with the processor, scaled voting data for multiple users; preparing, by executing instructions with the processor, voting results for the ballot presented in the program based on the scaled voting data; and determining, by executing instructions with the processor, an external influence based on the scaled voting data.

In some examples, the method includes sending, by executing instructions with the processor, instructions to the user device to: trigger collection of the audio metering data based on a programming schedule that is to identify when the program is to be broadcast; sample a sensed audio signal when the collection of the audio metering data is triggered; determine the audio metering data from the sensed audio signal; accept the voting data from the user device; transmit the audio metering data for access by the processor; and transmit the voting data for access by the processor.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A system to cause a device to support voting associated with a program, the system comprising:
   memory;
   first instructions; and
   processor circuitry to execute the first instructions to:
   send one or more second instructions to the device, the second instructions to cause the device to: (i) trigger collection of metering data from a sensed audio signal based on a programming schedule that is to identify when the program is to be broadcast, the program associated with a first time duration, the metering data associated with a second time duration, (ii) accept voting data associated with a ballot presented in the program, and (iii) report the metering data and the voting data;
   determine a level of user exposure to the program based on the first time duration and the second time duration; and
   adjust the voting data based on the level of user exposure.

2. The system of claim 1, wherein the processor circuitry is to authenticate a user of the device as a viewer of the program based on the adjusted voting data.

3. The system of claim 1, wherein the processor circuitry is to calculate a weighting score based on the level of user exposure.

4. The system of claim 1, wherein the processor circuitry is to void the voting data when the level of user exposure is null.

5. The system of claim 1, wherein the processor circuitry is to:
   aggregate the adjusted voting data associated with multiple devices;
   prepare voting results for the ballot based on the aggregated voting data; and
   determine an external influence based on the aggregated voting data.

6. The system of claim 5, wherein the external influence includes social media influence.

7. The system of claim 1, wherein the level of user exposure is based on the second time duration.

8. A non-transitory computer readable medium comprising first instructions that, when executed, cause one or more processors to at least:
   send one or more second instructions to a device, the second instructions to cause the device to: (i) trigger collection of metering data from a sensed audio signal based on a programming schedule that is to identify when a program is to be broadcast, the program associated with a first time duration, the metering data associated with a second time duration, (ii) accept voting data associated with a ballot presented in the program, and (iii) report the metering data and the voting data;
   determine a level of user exposure to the program based on the first time duration and the second time duration; and
   adjust the voting data based on the level of user exposure.

9. The non-transitory computer readable medium of claim 8, wherein the first instructions are to cause the one or more processors to authenticate a user of the device as a viewer of the program based on the adjusted voting data.

10. The non-transitory computer readable medium of claim 8, wherein the first instructions are to cause the one or more processors to calculate a weighting score based on the level of user exposure.

11. The non-transitory computer readable medium of claim 8, wherein the first instructions are to cause the one or more processors to void the voting data when the level of user exposure is null.

12. The non-transitory computer readable medium of claim 8, wherein the first instructions are to cause the one or more processors to:
   aggregate the adjusted voting data associated with multiple devices;
   prepare voting results for the ballot based on the aggregated voting data; and
   determine an external influence based on the aggregated voting data.

13. The non-transitory computer readable medium of claim 12, wherein the external influence includes social media influence.

14. The non-transitory computer readable medium of claim 8, wherein the level of user exposure is based on the second time duration.

15. The non-transitory computer readable medium of claim 8, wherein the metering data includes audio signatures.

16. A method to cause a device to support voting associated with a program, the method comprising:
   sending one or more instructions to the device, the instructions to cause the device to:
   (i) trigger collection of metering data from a sensed audio signal based on a programming schedule that is to identify when the program is to be broadcast, the program associated with a first time duration, the metering data associated with a second time duration, (ii) accept voting data associated with a ballot presented in the program, and (iii) report the metering data and the voting data;
   determining, by executing an instruction with a processor, a level of user exposure to the program based on the first time duration and the second time duration; and
   adjusting, by executing an instruction with the processor, the voting data based on the level of user exposure.

17. The method of claim 16, further including authenticating a user of the device at a view of the program based on the adjusted voting data.

18. The method of claim 16, further including calculating a weighting score based on the level of user exposure.

19. The method of claim 16, further including voiding the voting data when the level of user exposure is null.

20. The method of claim 16, further including:
   aggregating the adjusted voting data associated with multiple users;
   preparing voting results for the ballot based on the aggregated voting data; and
   determining an external influence based on the aggregated voting data.

* * * * *